(12) United States Patent
Nikkeshi et al.

(10) Patent No.: US 6,395,808 B1
(45) Date of Patent: May 28, 2002

(54) THERMOPLASTIC RESIN ADDITIVE

(75) Inventors: Susumu Nikkeshi, Kurokawa-gun; Maki Kanno, Fukushima, both of (JP)

(73) Assignee: Tohoku Munekata Co. LTD, Fukushima-ken (JP)

( * ) Notice: Subject to any disclaimer, the term of this patent is extended or adjusted under 35 U.S.C. 154(b) by 61 days.

(21) Appl. No.: 09/619,693

(22) Filed: Jul. 19, 2000

(30) Foreign Application Priority Data

Jul. 27, 1999 (JP) .......................... 11-212213

(51) Int. Cl.[7] .............................. C08K 5/13; C08K 5/24
(52) U.S. Cl. ............................. 524/72; 524/75; 524/76; 524/265; 252/400.31; 252/404
(58) Field of Search .............................. 524/72, 75, 76, 524/265; 252/400.31, 404

(56) References Cited

U.S. PATENT DOCUMENTS 6,194,489 B1 * 2/2001 Nokkeshi et al. ........... 523/212

FOREIGN PATENT DOCUMENTS

| DE | 3843994 A | 6/1990 |
| EP | 0818502 A | 1/1998 |
| EP | 0924252 A | 6/1999 |
| EP | 1026131 A | 8/2000 |

* cited by examiner

Primary Examiner—Kriellion A. Sanders

(57) ABSTRACT

Provided is an additive for a thermoplastic resin prepared by mixing tannin with a coupling agent, and the above additive inhibits the thermoplastic resin from being reduced in a molecular weight in heating and melting and achieves heat stabilization of the thermoplastic resin. Accordingly, it becomes possible to recycle the molded articles.

20 Claims, No Drawings

THERMOPLASTIC RESIN ADDITIVE

DETAILED DESCRIPTION OF THE INVENTION

Field of Industrial Application

In general, polycarbonate (PC), polybutylene terephthalate (PBT), polyethylene terephthalate (PET), blends thereof and thermoplastic resins obtained by blending one or a plurality of these resins with other resins cause heat decomposition when heated and molten in various molding processes and are reduced in a molecular weight, which results in a reduction in the mechanical properties. The present invention relates to a thermoplastic resin additive for preventing heat decomposition in such case and a heat stabilizing method of a thermoplastic resin using the above resin additive.

Problems to be Solved by the Invention

Resin materials, particularly the respective resins of PC, PBT and PET are heavily reduced in a molecular weight in heating and melting and therefore have notably been reduced in a molecular weight by virtue of heat given in the respective molding processes and a shearing stress in kneading. Accordingly, it has been difficult to recycle sprues and runners produced in molding as well as recycling of the products. An object of the present invention is to provide a novel thermoplastic resin additive which inhibits the preceding reduction in a molecular weight of resin materials in heating and melting and which can turn them into recyclable materials and a heat stabilizing method of a thermoplastic resin using the above resin additive.

Means for Solving the Problems

The object of the present invention described above can be achieved by:

(1) a thermoplastic resin additive comprising a tannin and a coupling agent, and (2) a heat stabilizing method of a thermoplastic resin characterized by adding 5 to 3000 ppm of the above resin additive to the thermoplastic resin. The present invention shall be explained below in further details.

Intensive researches of an influence exerted on materials by polyhydric phenol continued by the present inventors have resulted in finding that a thermoplastic resin can be inhibited from being reduced in a molecular weight in heating and melting by adding a compound obtained by adding a coupling agent to or reacting with tannin or a compound obtained by further adding a coupling agent to or reacting with tannin heated and dehydrated to be subjected to polycondensation.

The tannin used in the present invention is a general term of complicated aromatic compounds having a lot of phenolic hydroxyl groups which are widely distributed in the plant kingdom, and to roughly divide, it is divided into two kinds of a hydrolyzed type and a condensed type. Either of them is a natural compound, and therefore a lot of the compounds having different structures are present. Either tannin may be used in the present invention.

Polyhydric phenol compounds having a dye-fixing effect and a tanning effect of leather are called "synthetic tannin" and "cintan", and among the synthetic tannins, the compounds which are effectively used can be used as well in the present invention.

Also, tannic acid is called tannin as well and shall not specifically be distinguished in the present invention.

China tannin which is a typical hydrolyzed type tannin is shown by Formula (1). To further describe the China tannin, it has been apparent that the China tannin has a structure in which 10 gallic acid groups are disposed in the circumference of a glucose residue and two gallic acid groups are bonded in a vertical direction [a portion of a * mark in Formula (1)]. However, the center of the compound is not necessarily restricted to glucose and is the compound of a cellulose type in a certain case. Thus, tannins are compounds contained widely in plants in the natural world, and therefore it can readily be presumed that they are partially different in a chemical structure.

Tannins including decomposition products obtained by alkaline decomposition or hydrolytic decomposition of tannin are used as well in the present invention and, for example, didepside of gallic acid shown by Formula (2) which is obtained by hydrolysis of tannin can be used as well. At present, tannin is used for daily needs such as an ink, medical uses such as a hemostatic agent and industrial uses such as a tanning agent of leather and a mordant in dyeing, and in recent years, it is used as a food additive.

Further, tannins including catechin are used as well in the present invention. Catechin is a polyhydroxy derivative of 3-hydroxyflavane which is a polyhydric phenol compound and contained widely in plants in the natural world. It is said that catechin includes heterogeneous types having various molecular structures, and any ones are natural compounds, so that a lot of catechins having different structures are present. Catechin used in the present invention shall not specifically be restricted and may be any one as long as it is catechin which can effectively be used for the object of the present invention. Also, catechin is called shibu. At present, catechin is used for medical uses such as a carcinostatic agent and industrial uses such as a color fixing agent and a mordant for nylon.

Tannin preferably used in the present invention includes China tannin and 3,5,7,3', 4'-pentahydroxyflavane (catechin in terms of a narrow sense). Catechin (3), quebrotannin (4) and turkey tannin (5) are shown in Formula (3), Formula (4) and Formula (5) as various tannins having different chemical structures.

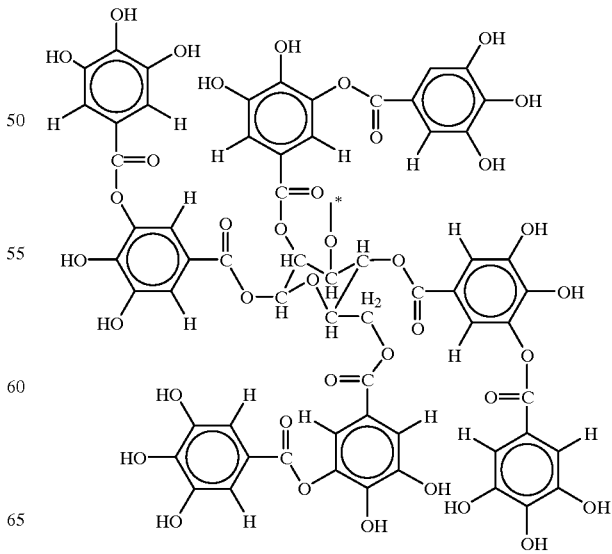

(1)

(2)

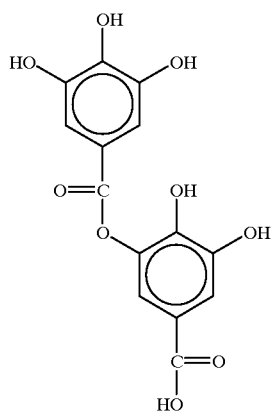

(3)

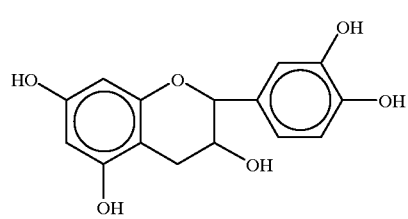
(a) Catechin

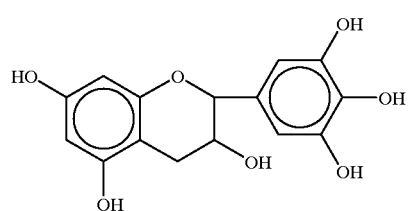
(b) epi-Gallocatechin

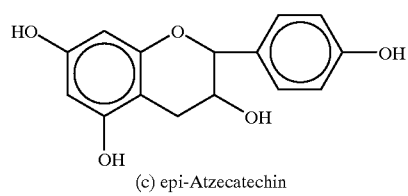
(c) epi-Atzecatechin

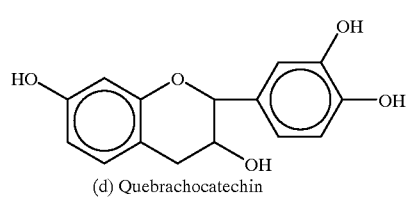
(d) Quebrachocatechin (4)

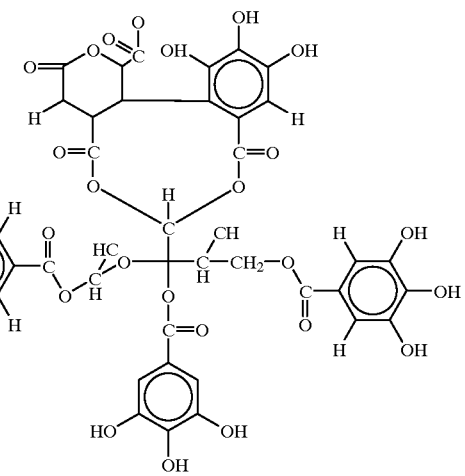

(5)

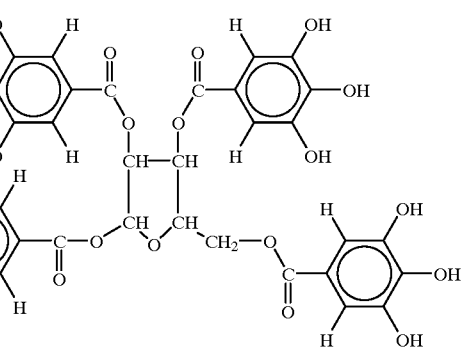

Tannin subject to polycondensation which is obtained by heating and dehydrating it at a temperature of 70 to 230° C., Preferably 90 to 160° C. can be used as well for the tannin used in the present invention. In this case, conditions of heating and dehydrating shall not specifically be restricted, and it is usually heated and dehydrated at 70° C. for about 8 hours, 230° C. for about 2 minutes and 90 to 160° C. for about 2 to 3 hours. When tannin is subjected to condensation polymerization, tannin is required to be dehydrated to some extent, and the whole thereof is not necessarily required to be subjected to condensation polymerization. In the case of China tannin, the product which is dehydrated by not much more than 8 to 11% is preferably used. Tannin thus subjected to polycondensation has the advantages that an OH group contained in tannin is reduced to some extent by polycondensation, and therefore when this is added to the thermoplastic resin, it can prevent the OH groups which are present in excess from being decomposed in heating and melting the resin and foaming in the resin to form bubbles and that the thermoplastic resin can further be thermally stabilized. In the present invention, tannins can be used alone or in a mixture of two or more kinds thereof. Next, the coupling agent used in combination with tannin in the present invention is a surfactant, and the coupling agents of a silane base, titanate base and an aluminate base are used. In the present invention, the coupling agents of a silane base are preferably used. Among them, the compounds having terminal groups such as an epoxy group, a vinyl group and an amino group are preferably used. To be specific, these coupling agents of a silane base include, for example, vinyltriethoxysilane, γ-methacryloxypropyltrimethoxysilane, γ-glycidoxypropyltrimethoxysilane, γ-aminopropyltriethoxysilane and trifuloropropylmethyldimethoxysilane, and the particularly preferred coupling agents of a silane base include γ-methacryloxypropyltrimethoxysilane, γ-glycidoxypropyltrimethoxysilane and trifuloropropylmethyldimethoxysilane. The coupling agent can be used in the form of a mixture with tannin or a compound obtained by reacting with tannin. Tannin is a compound containing a lot of phenolic hydroxyl compounds and therefore does not have so good wettability against a thermoplastic resin. Accordingly, it is considered that tannin does not have a so good dispersibility in a resin. It is considered that the coupling agent improves this dispersibility of tannin in a resin and elevates further more a heat stabilization of the resin. The coupling agents can used alone or in combination of two or more kinds thereof. The use amount of the coupling agent shall not specifically be restricted and is usually used in a proportion of 5 to 40 wt %, preferably 20 to 35 wt % based on the tannin. If the amount of the coupling agent is less than 5 wt %, it can not completely cover the molecules of tannin and provides less effect. On the other hand, the amount exceeding 40 wt % liberates the coupling agent to exert an adverse effect on a mechanical strength of the resin and therefore is not preferred. The thermoplastic resin additive of the present invention is added to the thermoplastic resin in an amount of 5 to 3000 ppm. In this case, the amount of less than 5 ppm is too small and therefore is not effective. On the other hand, the amount exceeding 3000 ppm increases water formed by tannin which is subjected to intermolecular dehydration when the resin is heated in molding, and this water foams in the resin. Accordingly, it is not preferred. The particularly preferred addition amount is 10 to 800 ppm. The thermoplastic resin additive of the present invention is added to the thermoplastic resin in the form of a powder or a solution obtained by dissolving in a solvent such as THF and a lower aliphatic alcohol.

A resin to which the thermoplastic resin additive of the present invention is intended to be added shall not specifically be restricted, but polycarbonate resins (PC) or thermoplastic polyesters, particularly polyethylene terephthalate (PET) and polybutylene terephthalate (PBT) are suitable. Further, preferably used are blends of them and blend resins of one or a combination of a plural thereof and other resins, for example, blend resins such as PC/ABS, PBT/ABS, PC/PBT, PC/PET, PC/polystyrene and PC/PBT/polystyrene.

The thermoplastic resin thus obtained to which the additive comprising tannin and the coupling agent is added is inhibited from a reduction in a molecular weight in heating and melting and makes it possible to recycle the molded article.

Effects of the Invention

As shown in the following examples and comparative examples, the addition of tannin mixed with the coupling agent inhibits thermoplastic resins such as PC and polyester base resins from being reduced in a molecular weight in heating and melting. Accordingly, heat stabilization of a thermoplastic resin can be achieved by using the thermoplastic resin additive of the present invention.

EXAMPLES

The present invention shall be explained below in further details with reference to examples and comparative examples.

Example 1

Taken in an agate-made mortar was 4 g of tannin (China tannin extra pure reagent manufactured by Koso Chemical Co., Ltd.), and one g of a silane base coupling agent (KBM503 manufactured by Shin-ethu Chemical Ind. Co., Ltd.) was further added thereto. They were mixed with a pestle so that they were ground to obtain a powder before turned into a paste. This was designated as CTS. Weighed was 59.00 g of a PC resin (brand name Panlite L-1250; polycarbonate resin, Mn=24700, Mw=60800, Mw/Mn= 2.46, manufactured by Teijin Chemicals Co., Ltd.), and 11.8 mg of cTS was further added thereto. This mixture was put into a plastometer (Lab Plastomill 50C150 type manufactured by Toyo Seiki Mfg. Co., Ltd.) and kneaded at a temperature of 280° C. and a revolution of 32 rpm. In this case, the addition amount of cTS to PC corresponds to 200 ppm. A sample of about 0.05 g for determining a molecular weight was taken by every 10 minutes during kneading.

The samples thus obtained were subjected to determination of a molecular weight by means of a gel permeation chromatography (hereinafter abbreviated as GPC; L7000 type manufactured by Hitachi, Ltd.), wherein a THF (tetrahydrofuran) solution of the sample having a concentration of about 0.05 wt % was allowed to flow at a pressure of 10 kg/cm$^2$ and a discharge amount of 0.5 ml/minute using THF as a carrier solvent and a detector RI. The results thereof are shown in Table 1. The virgin pellet of PC had an Mn of 24700.

Comparative Example 1

The same procedure as in Example 1 was repeated, except that cTS was not added. The results thereof are shown in Table 1 together.

Example 2

The same procedure as in Example 1 was repeated, except that China tannin used in Example 1 was changed to catechin (pharmaceutical codex catechin manufactured by Fuji Chemical Ind. Co., Ltd.). The results thereof are shown in Table 1 together.

Example 3

The same procedure as in Example 1 was repeated to determine the molecular weight, except that cTS was added so that the addition amount of cTS became 50, 100, 1000 and 3000 ppm, respectively. The results thereof are shown in Table 2.

Comparative Example 2

The same procedure as in Example 3 was repeated to determine the molecular weight, except the addition amount of cTS was controlled so that the concentration became 4 and 4000 ppm. The results thereof are shown in Table 2 together.

Example 4 cTS used in Example 1 was added to a PBT resin (Duranex 3200 manufactured by Polyplastics Co., Ltd.), PET (Kurapet 1030 manufactured by Kuraray Co., Ltd.), a PC/ABS alloy (Ubelloy CX104 manufactured by Ube Cycon Co., Ltd.) and a PBT/ABS alloy (Novalloy B1500 manufactured by Daicel Chemical Ind. Co., Ltd.) respectively so that the concentration was 200 ppm, and each 10 kg thereof was prepared. The whole amount thereof was put into an injection molding machine (IS-170 type manufactured by Toshiba Machinery Co., Ltd.) and molded into a plate of 240 mm×200 mm×2.4 mm on the conditions of a nozzle temperature of 280° C., an injection pressure of 995 kgf/cm$^2$, a holding pressure of 595 kgf/cm$^2$, an injection time of 1.61 seconds and a pressure-holding time of 21.4 seconds. This plate was crushed by means of a crusher (FNSK-15D manufactured by Nissui Kako Co., Ltd.). About 50 g of the sample for determining an MI was taken out of the crushed resin, and all of the remainder was injection-molded four times on the same conditions. A melt flow (MI value) of the crushed sample obtained above was determined by means of a melt indexer (C-50 type manufactured by Toyo Seiki Mfg. Co., Ltd.) in terms of an MI value. In essence, a deterioration of a resin has to be evaluated by a molecular weight, but the respective resins given above are not dissolved in THF used for determining a molecular weight, and therefore the molecular weights can not directly be measured. On the other hand, an MI value is correlative to a molecular weight, and therefore the evaluation was given in terms of the MI value. It is a matter of course that the lower the MI value is, the larger the molecular weight is and that an increase in the MI value shows a reduction in the molecular weight. The results thereof are shown in Table 3.

Comparative Example 3

The same procedure as in Example 4 was repeated, except that cTS was not added. The results thereof are shown in Table 3 together.

TABLE 1

Change in number average molecular weight after each kneading time

| | minute | | | | |
|---|---|---|---|---|---|
| | 10 | 20 | 30 | 40 | 60 |
| Example 1 | 23900 | 23600 | 23100 | 22900 | 22500 |
| Comparative Example 1 | 23500 | 22900 | 22100 | 21600 | 21000 |
| Example 2 | 23800 | 23300 | 22900 | 22800 | 22300 |

TABLE 2

Change in number average molecular weight when changing the addition concentration of cTS

| | minute | | | | |
|---|---|---|---|---|---|
| | 10 | 20 | 30 | 40 | 60 |
| Example 3 | | | | | |
| 5 (ppm) | 23400 | 22900 | 22800 | 22000 | 21600 |
| 50 (ppm) | 23500 | 23100 | 22800 | 21900 | 21500 |
| 100 (ppm) | 23800 | 23400 | 23100 | 22700 | 22100 |
| 1000 (ppm) | 23700 | 23300 | 22900 | 22300 | 22200 |
| 3000 (ppm) | 23500 | 23100 | 22500 | 22300 | 21900 |
| Comparative Example 2 | | | | | |
| 4 (ppm) | 23600 | 22700 | 22100 | 21700 | 21100 |
| 4000 (ppm) | 23400 | 22600 | 21500 | 21400 | 20500 |

TABLE 3

Change in MI values after each injection molding

| | | Frequency | | | |
|---|---|---|---|---|---|
| | | First | Second | Third | Fourth |
| Example 4 | PBT | 19 | 21 | 23 | 23 |
| | PET | 15 | 17 | 19 | 20 |
| | PC/ABS | 17 | 20 | 21 | 24 |
| | PBT/ABS | 19 | 21 | 21 | 22 |
| Comparative Example 3 | PBT | 21 | 25 | 30 | 39 |
| | PET | 15 | 20 | 26 | 30 |
| | PC/ABS | 18 | 27 | 35 | 41 |
| | PBT/ABS | 20 | 26 | 33 | 40 |

What is claimed is:

1. A thermoplastic resin additive comprising tannin and 5 to 40 wt %, based on weight of tannin, of a coupling agent.

2. The thermoplastic resin additive as described in claim 1, wherein the tannin is a polycondensation polymerization tannin which has been prepared by subjecting tannin to polycondensation and polymerization by heating and dehydrating the tannin at 70 to 230° C.

3. The thermoplastic resin additive as described in claim 1, wherein the coupling agent is a silane base coupling agent.

4. The thermoplastic resin additive as described in claim 1 or 2, wherein the tannin is China tannin or 3,5,7,3',4'-pentahydroxyflavane.

5. A method of heat stabilizing a thermoplastic resin comprising adding 5 to 3000 ppm of the thermoplastic resin additive of claim 1 to the thermoplastic resin.

6. The method of claim 5 for heat stabilizing the thermoplastic resin wherein the thermoplastic resin is a thermoplastic polycarbonate resin or a thermoplastic resin containing a thermoplastic polycarbonate resin.

7. The method of claim 5 for heat stabilizing the thermoplastic resin wherein the thermoplastic resin is a thermoplastic polyester resin or a thermoplastic resin containing a thermoplastic polyester resin.

8. A thermoplastic resin additive comprising a mixture of a polycondensed polymerized tannin and a coupling agent, wherein the tannin is obtained by polycondensing and polymerizing tannin at a temperature of 70–230° C. for 2 minutes to 8 hours, and the coupling agent is in an amount of 5–40 wt %, based on the weight of the tannin.

9. A thermoplastic resin additive according to claim 8 consisting essentially of a mixture of a polycondensed polymerized tannin and a silane coupling agent, wherein the tannin is obtained by polycondensing and polymerizing tannin at a temperature of 90 to 160° C. for 2 to 3 hours, and the coupling agent is in an amount of 20 to 35 wt %, based on the weight of tannin.

10. The thermoplastic resin additive according to claim 9, wherein the tannin is China tannin or 3,5,7,3',4'-pentahydroxyflavane.

11. A thermoplastic resin composition comprising a thermoplastic resin and the thermoplastic resin additive of claim 8, wherein the thermoplastic additive is in an amount of 5 to 3000 ppm, based on the weight of the thermoplastic resin.

12. A thermoplastic resin composition comprising a thermoplastic resin and the thermoplastic additive of claim 9, wherein the thermoplastic additive is in an amount of 10 to 800 ppm, based on the weight of the thermoplastic resin.

13. The thermoplastic resin composition according to claim 12 wherein the thermoplastic resin is a thermoplastic polycarbonate resin or a thermoplastic resin containing the polycarbonate resin.

14. The thermoplastic resin composition according to claim 12 wherein the thermoplastic resin is a thermoplastic polyester resin or a thermoplastic resin containing the thermoplastic polyester resin.

15. A process for heat stabilizing a thermoplastic resin which comprises subjecting tannin to polycondensation polymerization by heating the tannin at a temperature of 70 to 230° C. for 2 minutes to 8 hours and adding 5 to 40 wt %, based on weight of tannin, of a coupling agent to the polycondensed polymerized tannin to obtain a thermoplastic resin additive, and adding 5–3000 ppm of said additive, based on weight of thermoplastic resin, to said thermoplastic resin.

16. The process of claim 15 for heat stabilizing a thermoplastic resin which comprises subjecting tannin to polycondensation polymerization by heating the tannin at a temperature of 90 to 160° C. for 2 to 3 hours and adding 20 to 35 wt %, based on the weight of tannin, of a silane coupling agent to the polycondensed polymerized tannin to obtain a thermoplastic resin additive, and adding 10 to 800 ppm of said additive, based on weight of thermoplastic resin, to said thermoplastic resin.

17. The process of claim 16 for heat stabilizing a thermoplastic resin wherein the thermoplastic resin additive consists essentially of said polycondensed polymerized tannin and said salane coupling agent.

18. The process of claim 16 for heat stabilizing a thermoplastic resin wherein the tannin is China tannin or 3,5,7,3',4'-pentahydroxyflavane.

19. The process of claim 16 for heat stabilizing a thermoplastic resin wherein the thermoplastic resin is a thermoplastic polycarbonate resin or a thermoplastic resin containing the thermoplastic polycarbonate resin.

20. The process of claim 16 for heat stabilizing a thermoplastic resin wherein the thermoplastic resin is a thermoplastic polyester resin or a thermoplastic resin containing the thermoplastic polyester resin.

* * * * *